United States Patent [19]
Blanke et al.

[11] Patent Number: 5,738,141
[45] Date of Patent: Apr. 14, 1998

[54] WC-CISTERN FILLING VALVE

[75] Inventors: Willfried Blanke; Norbert Fuchs, both of Minden; Gerhard Pieper, Porta Westfalica, all of Germany

[73] Assignee: Rost GmbH & Co. KG, Porta Westfalica, Germany

[21] Appl. No.: 610,753

[22] Filed: Mar. 4, 1996

[30] Foreign Application Priority Data

Mar. 8, 1995 [DE] Germany .................. 195 08 258.3

[51] Int. Cl.⁶ .................. F16K 31/34; F16K 31/385; F16K 47/02
[52] U.S. Cl. .................. 137/414; 137/426; 137/430; 137/436; 137/443; 138/42; 251/126
[58] Field of Search .................. 137/414, 426, 137/430, 436, 441, 442, 443, 444; 138/42, 43; 251/126

[56] References Cited

U.S. PATENT DOCUMENTS

| 16,848 | 3/1857 | McHenry | 138/42 |
|---|---|---|---|
| 1,734,762 | 11/1929 | Clemmons | 251/126 |
| 1,901,633 | 3/1933 | Clemmons | 137/436 |
| 2,323,115 | 6/1943 | Bryant | 138/43 |
| 2,506,152 | 5/1950 | Hunter | 251/126 |
| 3,095,006 | 6/1963 | Smith | 138/43 |
| 3,194,258 | 7/1965 | Grant | 137/414 |
| 3,605,816 | 9/1971 | Nilsson | 138/43 |
| 4,106,525 | 8/1978 | Currie et al. | 138/42 |
| 4,338,964 | 7/1982 | Schoepe | 137/436 |
| 4,506,423 | 3/1985 | Nakamura et al. | 138/42 |
| 5,280,803 | 1/1994 | Swift et al. | 137/436 |

FOREIGN PATENT DOCUMENTS

| 0 084 082 | 7/1983 | European Pat. Off. . | |
|---|---|---|---|
| 0 470 642 | 2/1992 | European Pat. Off. . | |
| 2 492 868 | 4/1982 | France . | |
| 1011141 | 11/1965 | United Kingdom . | |
| 1220275 | 1/1971 | United Kingdom | 138/43 |
| 1467203 | 3/1977 | United Kingdom | 137/436 |

*Primary Examiner*—George L. Walton
*Attorney, Agent, or Firm*—Burns, Doane, Swecker & Mathis, L.LP.

[57] ABSTRACT

The present invention relates to a WC-cistern filling valve comprising a liquid inlet assigned to a supply line, a liquid outlet assigned to the cistern, and a closing element which is assigned to a valve passage opening arranged between liquid inlet and oulet and which is switchable by a float in accordance with the liquid level in the cistern for opening and closing the valve passage opening. It is the object of the present invention to provide a low-noise WC-cistern filling valve. This object is achieved in that at least a portion of the liquid outlet is shaped as a thread in the flow direction downstream of the closing element in such a manner that liquid is discharged with a swirl from the liquid outlet to the cistern in the opened state of the closing element.

12 Claims, 2 Drawing Sheets

WC-CISTERN FILLING VALVE

The present invention relates to a WC-cistern filling valve comprising a liquid inlet assigned to a supply line, a liquid outlet assigned to the cistern, and a closing element which is assigned to a valve passage opening arranged between liquid inlet and outlet, and which is switchable by a float according to the filling level in the cistern for opening and closing the valve opening.

Such filling valves for refilling a WC-cistern after the latter has been drained are widely used and have turned out to be best suited with respect to the refilling function. However, especially in the domestic area, the noise caused by the refilling of the WC cistern is often very objectionable. Toilet rooms are normally arranged in direct vicinity of the sleeping rooms in apartments and that is why, especially when a toilet system is used during the night, the other inhabitants of the building are disturbed by unwanted noise. This is the reason why lately very great efforts have been made to provide WC-cistern filling valves that refill the cistern relatively silently.

It is therefore the object of the present invention to provide a WC-cistern filling valve of the above-mentioned type which hardly causes any noise-related pollution.

This object is achieved according to the invention in that at least a portion of the liquid outlet is formed in the flow direction downstream of the closing element as a thread in such a manner that liquid is discharged with a swirl from the liquid outlet into the cistern in the opened state of the closing element.

Hence, part of the flow energy is used for the defined generation of a swirl and thus of a centrifugal force component, so that such a flow filled into the cistern causes as little flow-induced noise as possible.

As a rule, the thread need not supply the liquid flow to the cistern directly. In a variant, it is suggested that the liquid outlet should have assigned thereto next to the thread a filling tube whose lower end is substantially immersed into the liquid at least at the lower filling level in the cistern. The liquid flow which has been swirled can excellently flow down on the inner wall of the filling tube, tightly adhering to the inner wall due its centrifugal flow component. Since the lower end of the filling tube is always immersed in the liquid, there is no additional noise caused by the impact of freely falling water on a water surface. In particular, the thread can substantially pass into the inner wall of the filling tube, so that substantially no noise-creating turbulences are generated when the liquid flow exits from the thread into the filling tube.

It is especially advantageous in another embodiment when a throttling means is arranged in the liquid outlet in the flow direction downstream of the closing element. The throttling means ensures that in the cross sections downstream thereof a substantially complete filling is at least given in the thread with as little air inclusions as possible, so that resultant turbulences are suppressed. Furthermore, the throttle ensures that in every operative state a sufficient amount of liquid can additionally and subsequently flow through the valve passage opening into the thread for completely filling the same. Another noise reduction is also given by the throttle.

An especially simple variant is here that the flow cross-section is reduced in a portion, preferably in the center portion, of the thread. The advantage is that thread and throttle are produced by one and the same component, resulting in a less expensive design and a simpler construction.

To increase the swirl of the liquid flow gradually, at least the outer diameter of the thread can increase in the flow direction at least in portions. The gradual increase in the centrifugal force component further reduces noise development.

The thread may advantageously be formed between a conical insertion member and a housing member provided with a correspondingly conical internal thread. A simple screwing of the two members into one another automatically yields both an exact arrangement thereof and the defined position of the thread. Moreover, two members screwed into each other can perfectly be sealed relative to each other, thereby preventing leakage flow on the thread.

The float can preferably be arranged in the filling tube, and a control rod is guided substantially coaxially through the filling tube, the screw member, and the housing member inserted into the upper end of the filling tube, namely upwards through a corresponding opening in the housing member, the opening additionally serving to air and vent the filling tube. This guarantees a very compact design of the whole low-noise filling valve, whereby a space-saving arrangement becomes readily possible.

In particular, a reliable filling function of the filling valve can be achieved in that the closing element is formed by a diaphragm which has assigned thereto a relief chamber to be opened or closed via a valve tappet which is in operative communication with the control rod of the float, the relief chamber being in communication with the liquid inlet via a small narrow annular gap on the diaphragm and a liquid pressure being exertable on the diaphragm through the relief chamber over a larger surface than through the liquid inlet. The relief chamber ensures a reliable self-retainment of the diaphragm in the opened or closed state in a known manner according to the position of the float and of the associated opened or closed position of the valve tappet.

In an embodiment it has been found to be suitable when the valve passage opening is formed by a tubular section simultaneously closable by the diaphragm as part of the liquid inlet and by an annular channel surrounding the tubular section as part of the liquid outlet, the annular channel being connected to the thread.

An embodiment of the invention shall now be explained in more detail with reference to a drawing, in which.

Figure 1:
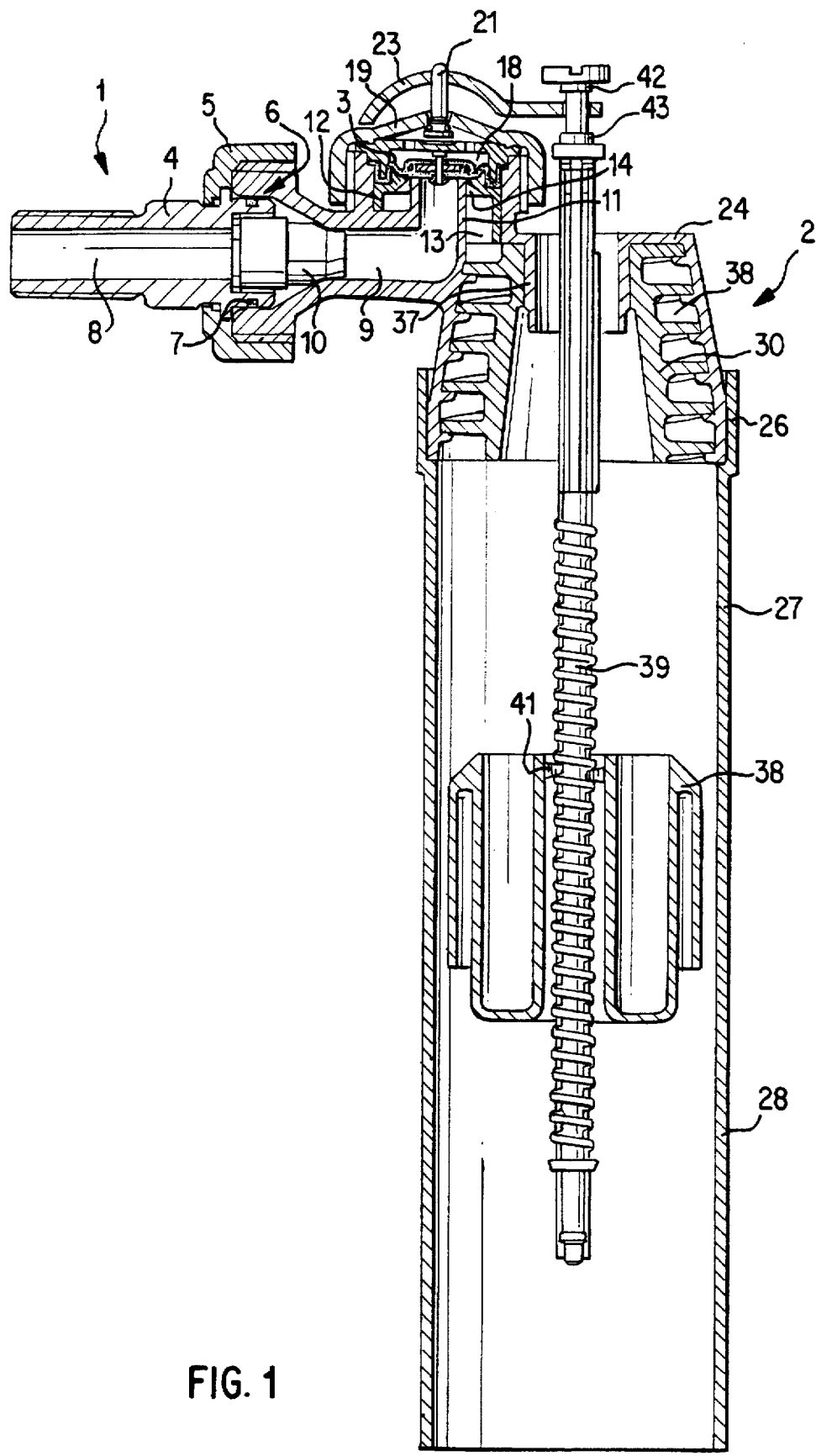
FIG. 1 shows a WC-cistern filling valve according to the present invention.

The WC-cistern filling valve as shown in the figures is used for supplying water into the cistern after the latter has substantially been drained. The filling valve comprises a liquid inlet 1, a liquid outlet 2 and a diaphragm separating these two members as a closing element.

The liquid inlet 1 is composed of a connection member 4 for connection to a supply line (not shown) which is screwed by means of a union nut 5 to the valve housing 6 proper. The connection member 4 and the valve housing 6 are sealed relative to each other via a sealing ring 7. Bore 8 of connection member 4 and flow opening 9 of valve housing 6 have inserted therebetween a nozzle member 10 which ensures that there is as little change as possible in the flow cross-section from the transition of connection member 4 to valve housing 6.

The flow opening 9 in valve housing 6 has a 90° bend and ends in a tubular member 11 on the face of which diaphragm 3 is seated in the closed state of the filling valve. The tubular member 11 is surrounded by an insertion member 12 inserted into the housing, so that an annular channel 13 with a funnel-shaped inlet opening 14 is formed around the tubular member 11 as part of the valve passage opening.

The diaphragm 3 is firmly retained between insertion member 12 and a perforated plate 15 on valve housing 6. The perforated plate 15 has provided thereon a guide mandrel 16 which in the area of the valve passage opening at the end of tubular member 11 engages with a play into a guide member 17 arranged in diaphragm 3 for forming a narrow annular gap. The annular gap connects the liquid inlet 1 to a relief chamber 18 formed at least between the diaphragm 3 and the perforated plate 15. This lower portion of the relief chamber 18 communicates via holes in the perforated plate 15 with the upper portion of the relief chamber 18. The upper portion of the relief chamber 18 is surrounded by a screw cap 19 screwed onto valve housing 6 and by the perforated plate 15. The screw cap 19 comprises a valve opening 20 in which a valve tappet 21 is disposed with a seal 22 for opening or closing valve opening 20. Valve tappet 21 has mounted thereon an actuation lever 23 which is preferably provided on valve housing 6 or screw cap 19 and through the pivotal movement of which valve tappet 21 opens or closes valve opening 20 accordingly.

In the area of the liquid outlet 2, valve housing 6 comprises an enlarged housing portion 24 shaped as a truncated cone, which is firmly inserted with its lower end portion 25 into the upper end 26 of a filling tube 27 whose lower end 28 is immersed into the water in the cistern, preferably all the time. The enlarged housing portion has a conical internal thread 29 into which a conical screw member 30 is screwed with a correspondingly conical external thread 31 with a substantially snug fit. The conical internal thread 29 and the external thread 31 are adapted to each other such that, although the screw member 30 is adequately guided and secured in the enlarged housing portion 24, a flow channel is shaped in the form of a thread 32 between said two members and has an upper end in flow communication with the annular channel 13. The thread 32 is shaped such that the flow cross-section thereof is larger in the entry portion 33 and the exit portion 34 than in the center portion 35. Hence, a throttle is simultaneously provided for by thread 32.

At its upper end, the enlarged housing portion 24 is provided with an opening 36 which is surrounded by a collar 37.

This collar 37 and the adjoining inner face of the enlarged housing portion 24 lie sealingly together, substantially with a snug fit, with correspondingly shaped sections of the screw member 30, so that no leakage current flows past thread 32 directly into filling tube 27.

A float 38 which is adjustably mounted on a control rod 39 is located in the interior of filling tube 27. The control rod 39 extends through the filling tube 27, the screw member 30 and opening 36 upwards and is connected to the actuation lever 23 at its upper end. To adjust the different positions of float 38 relative to control rod 39, control rod 39 comprises an external thread 40 which is engaged by corresponding threads 41 of the float. The upper end of control rod 39 comprises two stop surfaces 42 and 43 which permit operation of the actuation lever 23 with a predetermined play.

Figure 2:
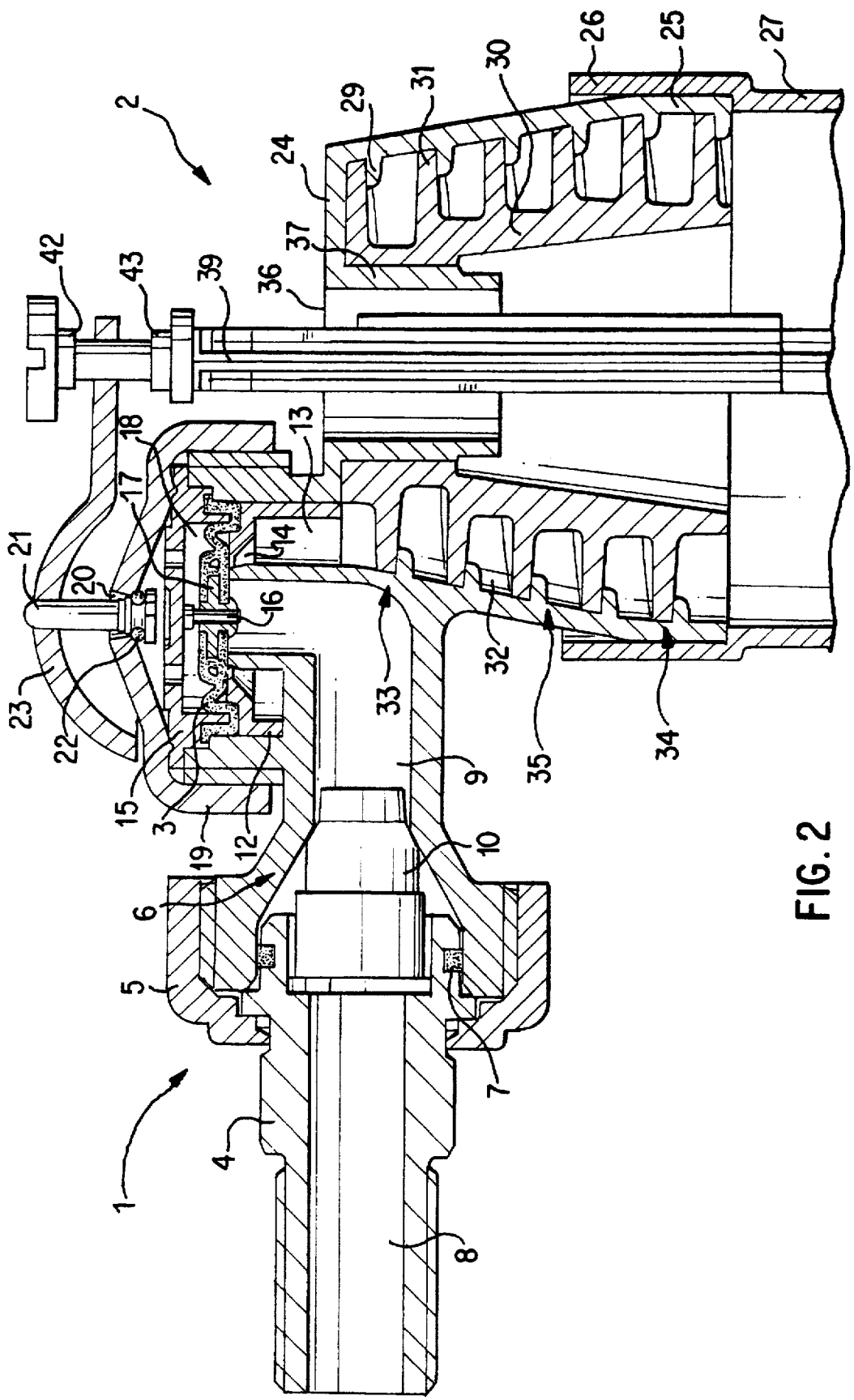
FIG. 2 is an enlarged view of the upper portion of the filling valve of FIG. 1.

The operation and function of the above-described embodiment shall now be described in more detail:

The filling valve shown in FIGS. 1 and 2 is in its closed position. The position of float 38 defines the filling level in the cistern at which the lower stop surface 43 presses against the actuation lever 23 and moves the valve tappet 21 upwards for closing valve opening 20. In this position, water can now flow from the liquid inlet 1 through the annular gap between guide mandrel 16 and guide member 17 into the relief chamber 18 and simultaneously exert a force on valve tappet 21, so that the tappet is pressed into its closed position. Since the same pressures prevail in the liquid inlet 1 and in the relief chamber 18 and since the liquid in the relief chamber 18 can press with a much greater surface onto the diaphragm 3 than the liquid from liquid inlet 1, the diaphragm is retained in its closed position. This is a so-called hydraulic self-retainment.

When the cistern is now drained by a flushing operation, the float 38 in the filling tube sinks, since the filling tube 27 can be filled with air through opening 26. When the upper stop surface 42 abuts on the actuation lever 23, the valve tappet 21 is moved downwards against the liquid pressure prevailing in the relief chamber 18, and the liquid in the relief chamber 18 can escape through valve opening 20. Since no pressure or only a small pressure can build up in the relief chamber 18, the liquid in liquid inlet 1 can now press the diaphragm 3 upwards, thereby releasing the valve passage opening. Water flows out of the tubular member 11 and laterally via inlet opening 14 into the annular channel 13. Water is introduced from the annular channel into thread 32. Hence, a swirl which is additionally increased due to the conical shape when viewed in the flow direction is imparted to the water. In addition, the throttling point in thread 32 in the center portion 35 has the effect that a sufficient amount of water can always flow additionally and subsequently to fill the thread 32 entirely. The water exiting from the thread 32 with a swirl continues to flow with a swirl on the inner surface of filling tube 27 past the float downwards where it is filled into the water provided in the cistern with little noise. The filling noise of such a valve can considerably be reduced owing to the fact that a corresponding swirl is imparted to the water flow. Of course, float 38 will again float upwards during this process according to the filling level in the cistern until the lower stop surface 43 moves the actuation lever 23 again upwards, thereby closing the valve opening 20. The filling valve is immediately closed again.

We claim:

1. A WC-cistern filling valve comprising:

a liquid inlet for receiving liquid from a supply line;

a liquid outlet for discharging liquid to the cistern;

a closing element arranged in a valve passage opening between the liquid inlet and the liquid outlet, the closing element operable between an open position and a closed position in accordance with a filing level within the cistern;

a threaded screw member within the liquid outlet which discharges the liquid in a swirl when the closing element is in the opened position, the screw member having a central opening; and a control rod for operating the closing element, the control rod passing through the central opening of the threaded screw member and at least a portion of the liquid outlet, wherein the control rod operates the closing element in response to a liquid level in the liquid outlet.

2. The filling valve according to claim 1, wherein a float is arranged in a filling tube of the liquid outlet and the control rod is attached to the float and guided substantially coaxially through said filling tube and the central opening of the threaded screw member.

3. A WC-cistern filling valve comprising a liquid inlet assigned to a supply line, a liquid outlet assigned to said cistern, and a closing element assigned to a valve passage opening arranged between the liquid inlet and the liquid outlet, said closing element being switchable by a float in accordance with the filling level in said cistern for opening and closing said valve passage opening, at least a portion of said liquid outlet having a flow channel shaped as a thread in the flow direction downstream of said closing element in such a manner that liquid is discharged with a swirl from said liquid outlet to said cistern in the opened state of said closing element, the liquid outlet including a filling tube, said float being arranged in said filling tube and a control rod being guided substantially coaxially through said filling tube, said screw member and a housing member being inserted into an upper end of said filling tube, the control rod extending upward through a corresponding opening in said housing member, said opening additionally serving to air and vent said filling tube.

4. The filling valve according to claim 3, wherein a filling tube whose lower end is substantially immersed into the liquid at least at the lower filling level in said cistern is assigned to said liquid outlet next to said flow channel shaped as a thread.

5. The filling valve according to claim 3, wherein said flow channel shaped as a thread substantially passes into an inner wall of a filling tube of said liquid outlet.

6. The filling valve according to claim 3, wherein a throttling means is arranged in said liquid outlet in the flow direction downstream of said closing element.

7. The filling valve according to claim 3, wherein at least the outer diameter of said flow channel shaped as a thread is increased in the direction of flow at least in portions.

8. The filling valve according to claim 7, wherein said flow channel shaped as a thread is formed between a conical screw member and a housing member provided with a correspondingly conical internal thread.

9. The filling valve according to claim 3, wherein said closing element is formed by a diaphragm which has assigned thereto a relief chamber to be one of opened and closed via a valve tappet which is in operative communication with a control rod of said float, said relief chamber being in communication with said liquid inlet via a small narrow angular gap on said diaphragm, and a liquid pressure being exertable by said relief chamber over a larger surface on said diaphragm than through said liquid inlet.

10. The filling valve according to claim 9, wherein said valve passage opening is formed by a tubular section being simultaneously closable by said diaphragm as part of said liquid inlet and by an annular channel surrounding said tubular section as part of said liquid outlet, said annular channel being connected to said flow channel shaped as a thread.

11. The filling valve according to claim 3, wherein the flow channel has a cross-section and includes an entry portion, the cross-section being reduced at a portion located downstream of the entry portion to reduce noise development.

12. A WC-cistern filling valve comprising a liquid inlet assigned to a supply line, a liquid outlet assigned to said cistern, and a closing element assigned to a valve passage opening arranged between the liquid inlet and the liquid outlet, said closing element being switchable by a float in accordance with the filling level in said cistern for opening and closing said valve passage opening, at least a portion of said liquid outlet having a flow channel shaped as a thread in the flow direction downstream of said closing element in such a manner that liquid is discharged with a swirl from said liquid outlet to said cistern in the opened state of said closing element, the flow channel having an entry portion and a cross-section, the cross-section being reduced at a portion located downstream of the entry portion to reduce noise development, the liquid outlet including a filling tube, said float being arranged in said filling tube and a control rod being guided substantially coaxially through said filling tube, said screw member and a housing member being inserted into an upper end of said filling tube, the control rod extending upward through a corresponding opening in said housing member, said opening additionally serving to air and vent said filling tube.

* * * * *